United States Patent
He

(10) Patent No.: US 11,150,498 B2
(45) Date of Patent: Oct. 19, 2021

(54) DETECTION METHOD AND DEVICE OF DISPLAY PANEL AND AUTOMATIC OPTIC INSPECTION APPARATUS

(71) Applicant: HKC Corporation Limited, Guangdong (CN)

(72) Inventor: Huailiang He, Guangdong (CN)

(73) Assignee: HKC Corporation Limited, Guangdong (CN)

( * ) Notice: Subject to any disclaimer, the term of this patent is extended or adjusted under 35 U.S.C. 154(b) by 503 days.

(21) Appl. No.: 16/313,993

(22) PCT Filed: Jul. 19, 2018

(86) PCT No.: PCT/CN2018/096297
§ 371 (c)(1),
(2) Date: Dec. 28, 2018

(87) PCT Pub. No.: WO2019/169822
PCT Pub. Date: Sep. 12, 2019

(65) Prior Publication Data
US 2021/0271122 A1 Sep. 2, 2021

(30) Foreign Application Priority Data
Mar. 8, 2018 (CN) .......................... 201810189902.2

(51) Int. Cl.
*G01N 21/88* (2006.01)
*G02F 1/13* (2006.01)

(52) U.S. Cl.
CPC ....... *G02F 1/1309* (2013.01); *G01N 21/8851* (2013.01)

(58) Field of Classification Search
CPC .. G01N 21/898; G01N 21/8851; G01N 21/88; G01N 21/892; G01N 21/956; G02F 1/1309
USPC .............................. 356/237.2–237.6
See application file for complete search history.

(56) References Cited

U.S. PATENT DOCUMENTS

| 7,266,232 | B2 * | 9/2007 | Asai | G06K 9/4647 |
| | | | | 348/128 |
| 7,388,979 | B2 * | 6/2008 | Sakai | G01N 21/9501 |
| | | | | 348/126 |
| 2002/0161534 | A1 * | 10/2002 | Adler | G01N 23/2252 |
| | | | | 702/35 |
| 2007/0146696 | A1 * | 6/2007 | Noguchi | H01J 37/00 |
| | | | | 356/237.5 |
| 2012/0268742 | A1 * | 10/2012 | Hatano | G01R 31/2656 |
| | | | | 356/364 |

* cited by examiner

*Primary Examiner* — Isiaka O Akanbi
(74) *Attorney, Agent, or Firm* — Seyfarth Shaw LLP

(57) ABSTRACT

A detection method and device of a display panel are disclosed. The detection method includes: selecting at least two comparison points for a detection point with a set comparison pitch, the detection point corresponding to a separation cell or a pixel cell; detecting a first defect and a second defect of a display substrate according to gray scale values of the detection point and 2 comparison points, wherein the first defect includes a normal separation cell and a pixel defect and the second defect includes a pixel defect and a defected separation cell; and determining the defected separation cell according to the first defect and the second defect.

20 Claims, 12 Drawing Sheets

DETECTION METHOD AND DEVICE OF DISPLAY PANEL AND AUTOMATIC OPTIC INSPECTION APPARATUS

CROSS REFERENCE TO RELATED APPLICATIONS

This is a National Stage application of, and claims priority to, PCT/CN2018/096297, filed Jul. 19, 2018, which claims priority to Chinese Patent Application No. 201810189902.2, filed Mar. 8, 2018, the disclosures of which are incorporated herein by reference in their entirety.

TECHNICAL FIELD

Embodiments of the present disclosure relate to display technologies, more specifically relate to a detection method and device of a display panel and an automatic optic inspection apparatus.

BACKGROUND

Liquid crystal displays has become mainstream display devices currently due to their advantages such as low weight, low power consumption, high definition and passive light emission, and are widely used in electronic display products such as mobile phones, computers and televisions. The liquid crystal displays are complex in process and have numerous problems to be solved. For example, the loss of a support post (a post spacer, PS) on a display substrate (such as a color film substrate) is one of the common problems. The support post maintains a gap between a TFT substrate and a CF substrate. The loss of the support post would affect the thickness of a liquid crystal cell, leading to gravity mura or vacuum babbles. Furthermore, since a liquid crystal display screen lacks support, the ability of the liquid crystal display screen to resist pressing would reduce significantly.

Currently, the support post is detected by an automatic optic inspection (AOI) apparatus. A detection process of the support post is as follows: calculating a support post distribution diagram in a normal state first, then comparing with an image obtained through detection of the AOI apparatus, and obtaining a position where the support post is lost by comparison. Large computer resource consumption is made in this method due to the need for diagram comparison, and the method is time-consuming, which affects the production time for a display apparatus as a whole.

SUMMARY

Accordingly, a detection method and device of a display panel is provided in the present disclosure, so as to efficiently detect a position where a support post is lost, save computer resources and save production time for a display apparatus.

In an embodiment, a detection method of a display panel is provided in the present disclosure, including: selecting a detection point on a display substrate, where the detection point corresponds to a separation cell or a pixel cell; selecting at least two comparison points for the detection point according to a set comparison pitch; determining, according to a gray scale value of the detection point and gray scale values of the at least two comparison points, whether the detection point is a defect on the display panel so as to detect a first defect and a second defect of the display substrate; and determining a defected separation cell according to the first defect and the second defect.

In another embodiment, a detection device of a display panel is provided in the present disclosure, including: a detection point selection module, a comparison point selection module, a defect detection module and a defected separation cell determining module.

The detection point selection module is configured to select a detection point on a display substrate, where the detection point corresponds to a separation cell or a pixel cell.

The comparison point selection module is configured to select at least two comparison points for the detection point according to a set comparison pitch.

The defect detection module is configured to determine, according to a gray scale value of the detection point and gray scale values of the at least two comparison points, whether the detection point is a defect on the display panel so as to detect a first defect and a second defect of the display substrate.

The defected separation cell determining module is configured to determine the defected separation cell according to the first defect and the second defect.

In a further embodiment, a detection method of a display panel is also provided in the present disclosure. The display panel includes a plurality of separation cells and a plurality of pixel cells. The detection method of a display panel includes: obtaining a gray scale distribution diagram by scanning the display panel with an automatic optic inspection apparatus, where the gray scale distribution diagram includes a plurality of gray scale points, and the plurality of gray scale points are in one-to-one correspondence with the plurality of separation cells and the plurality of pixel cells; taking each gray scale point as a detection point, determining a first set from the plurality of gray scale points according to a gray scale value of the detection point and gray scale values of a plurality of first comparison points, and determining a second set from the plurality of gray scale points according to the gray scale value of the detection point and gray scale values of a plurality of second comparison points; determining gray scale points belonging to both the first set and the second set as a third set; and determining a defected pixel cell according to the gray scale points in the third set.

It is determined whether the detection point belongs to the first set by the following steps: obtaining a first standard value according to the gray scale value of the detection point and the gray scale values of the plurality of first comparison points; and if an absolute value of the difference between the gray scale value of the detection point and the first standard value is greater than a first threshold value, determining that the detection point belongs to the first set.

It is determined whether the detection point belongs to the second set by the following steps: obtaining a second standard value according to the gray scale value of the detection point and the gray scale values of the plurality of second comparison points; and if an absolute value of the difference between the gray scale value of the detection point and the second standard value is greater than a second threshold value, determining that the detection point belongs to the second set. In the detection method and device of the display panel and the automatic optic inspection apparatus provided in the present embodiment, a detection point on a display substrate is selected by controlling a comparison pitch; at least two comparison points are selected around the detection point with a set comparison pitch; it is determined whether the detection point is a defect on the display panel according to gray scale values of the detection point and the at least two comparison points, so that a first detect, including a normal separation cell and a pixel defect, and a second detect, including a pixel defect and a defected separation cell, of the display substrate may be detected; and then, according to the first defect and the second defect, that is, comparison between the first defect and the second defect, the defected separation cell may be determined, which avoids comparing a standard support post distribution diagram with a detected image, thus reducing a large amount of image data processing operations, so that the defected separation cell may be detected efficiently, computer resources may be saved and the production time for a display apparatus may be saved.

BRIEF DESCRIPTION OF THE DRAWINGS

Exemplary embodiments of the present disclosure are described below in detail with reference to the accompanying drawings, so that a person of ordinary skill in the art can understand the foregoing and other features and advantages of the present disclosure.

DETAILED DESCRIPTION OF THE EMBODIMENTS

The technical solutions of the present disclosure are further described below with reference to the accompanying drawings and specific embodiments. It may be understood that the specific embodiments described herein are merely used to explain the present disclosure, but are not intended to limit the present disclosure. In addition, it should be noted that, for ease of description, the accompanying drawings only show some rather than all of the structures related to the present disclosure.

Figure 1:
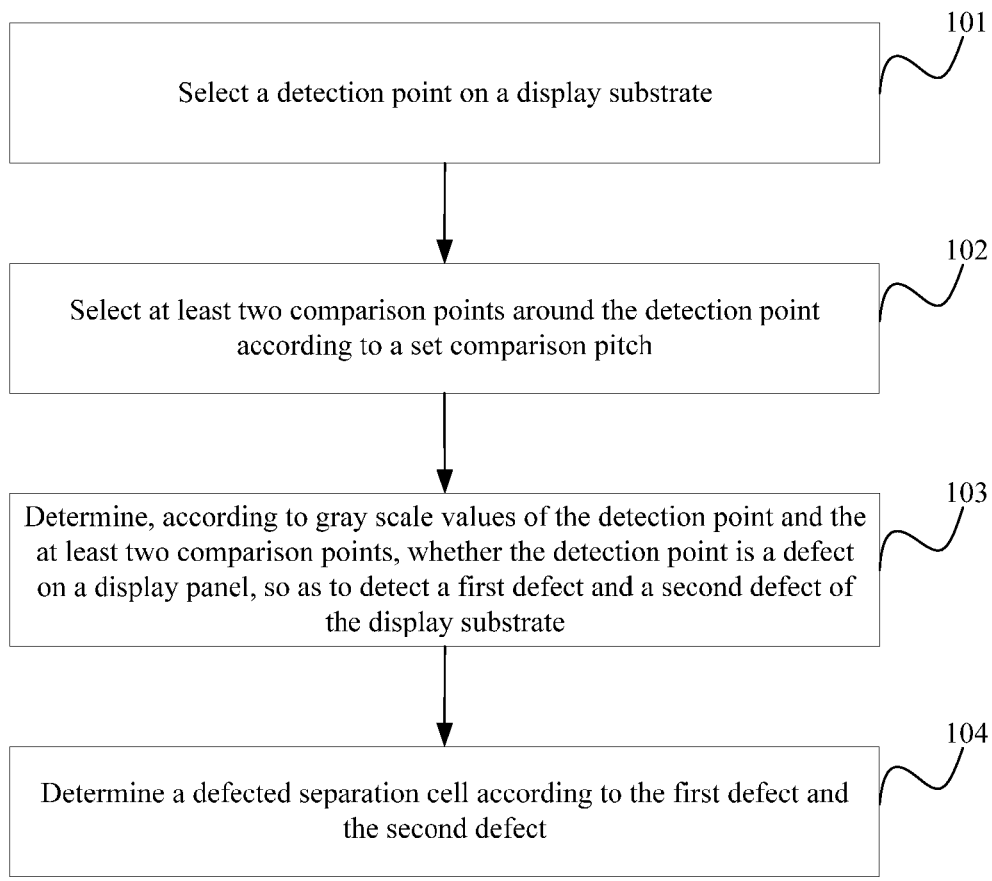
FIG. 1 is a schematic flow chart of a detection method of a display panel provided in an embodiment of the present disclosure.

FIG. 1 is a schematic flow chart of a detection method of a display panel provided in an embodiment of the present disclosure. The method is adapted for detecting a case where a separation cell in a display is defected, and the method may be executed by a detection device of a display panel. The detection device of a display panel may be implemented by software or hardware or a combination of hardware and software, and the detection device of a display panel may be arranged in an automatic optic inspection apparatus. As shown in FIG. 1, the detection method of a display panel of the present disclosure includes: steps 101 to 104.

In step 101, a detection point on the display substrate is selected.

The detection point is a separation cell or a pixel cell. In the present embodiment, all separation cells and pixel cells on the display substrate are used as detection points to be detected, so as to ensure that all defects on the display substrate are detected. By way of example, an automatic optic inspection apparatus may detect the defects one after the other by moving a detection point of an optic lens automatically.

In step 102, at least two comparison points are selected around the detection point with a set comparison pitch.

Figure 2A:
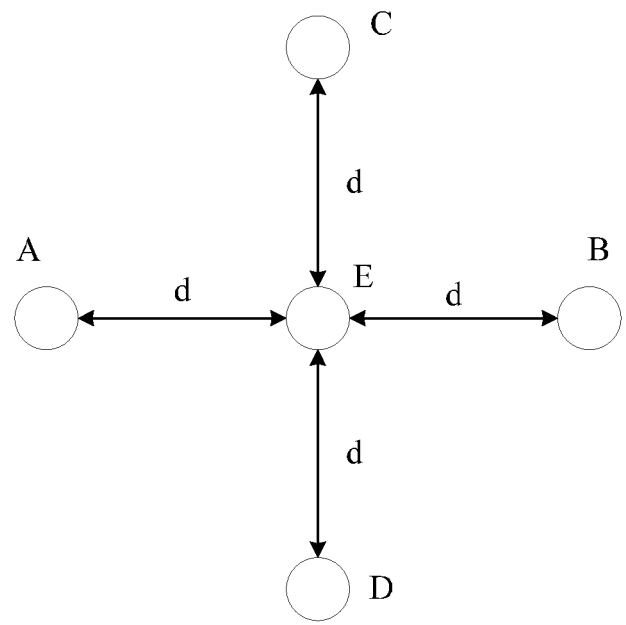
FIG. 2A to FIG. 2B are schematic basic principle diagrams of a five-point comparison method provided in an embodiment of the present disclosure.
Figure 2B:
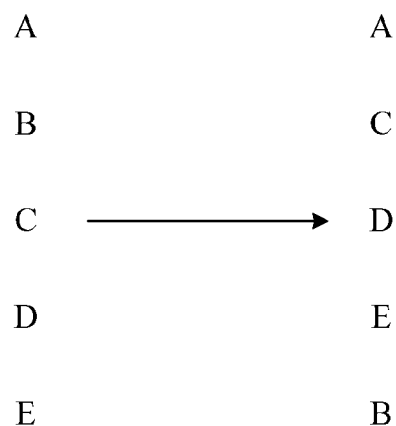

Optionally, by way of example, four comparison points, for example, are selected around the detection point with the set comparison pitch. FIG. 2A to FIG. 2B are elemental schematic diagrams of a five-point comparison method provided in the present embodiment. Referring to FIG. 2A, a detection point E may be selected first, and four comparison points A, B, C and D are selected around the detection point E respectively with a fixed comparison pitch d.

In step 103, it is determined, according to a gray scale value of the detection point and gray scale values of at least two comparison points, whether the detection point is a defect on the display panel. Based on step 102, with the five-point comparison method (the detection point is compared with the four comparison point for gray scale values) in the present embodiment, a normal separation cell together with a pixel defect are detected to be first defects on the display substrate, so as to determine a defected separation cell in combination with a second defect. In the present embodiment, the separation cell may be arranged in a liquid crystal cell of a liquid crystal display. Defected separation cells refer to those in which a support post is lost or incomplete.

The gray scale values of the detection point and the four comparison points are sorted by size. The third gray scale value is selected as a standard value, and the gray scale value of the detection point is compared with the standard value. If the difference between the gray scale value of the detection point and the standard value is greater than a set value, it is determined that the detection point is the defect on the display panel. By way of example, referring to FIG. 2B, the gray scale values of the detection point E and the four comparison points (A, B, C, D) are sorted from small to large (or from large to small) according to the size of the gray scale values, a point sorted in the middle (such as the comparison point D) is taken as a standard value, and then the gray scale value of the detection point E is compared with the standard value. If an absolute value of the difference between the gray scale value of the detection point E and the standard value is greater than a set value (for example, 10), the detection point E is considered to be a defect on the display substrate. If the absolute value of the difference between the gray scale value of the detection point E and the standard value is less than or equal to the set value, the detection point E is considered to be normal.

In step 104, the defected separation cell is determined according to the first defect and the second defect.

In the present embodiment, the normal separation cell may be considered to be the first defect, and the second defect includes the pixel defect and the defected separation cell, therefore, the defected separation cell may be determined directly by a simple comparison and calculation of the first defect and the second defect.

A separation cell is a position where a support post is planned to be arranged. The separation cell includes normal separation cells and defected separation cells. The normal separation cell is a position where a support post is planned to be arranged and the support post is successfully arranged, and the defected separation cell is a position where a support post is planned to be arranged but the support post is not successfully arranged.

The detection method of a display panel provided in the present embodiment includes: based on a comparison method for automatic optic inspection, selecting a detection point on a display substrate by controlling a comparison pitch of the comparison method; selecting at least two comparison points around the detection point with a set comparison pitch; determining, according to gray scale values of the detection point and the at least two comparison points, whether the detection point is a defect on the display panel, so that a first detect, including normal separation cells and pixel defects, and a second detect, including pixel defects and defected separation cells, of the display substrate may be detected; and then, according to the first defect and the second defect, that is, a comparison between the first defect and the second defect, the defected separation cells may be determined, which avoids comparing a standard support post distribution diagram with a detected image, thus reducing a large amount of image data processing operations, so that the defected separation cells may be detected efficiently, computer resources may be saved and the production time for a display apparatus may be saved.

In an embodiment, determining whether the detection point is a defect on the display panel may include:

when the set comparison pitch is one or more standard pixel pitches (cell pitches), determining that the detection point is the first defect on the display panel; and when the set comparison pitch is one or more standard separation cell pitches (PS pitches), determining that the detection point is the second defect on the display panel, The standard pixel pitch may be a pitch between two adjacent sub-pixels of periodically disposed RGB or WRGB. The standard separation cell pitch is determined by the number of sub-pixels between two adjacent separation cells as well as the standard pixel pitch. For example, when three sub-pixels are arranged between the two adjacent separation cells, the standard separation cell pitch is four times of the standard pixel pitch, so that when separation cells are detected by the five-point comparison method, it may be ensured that comparison is performed between five separation cells, and when sub-pixels are detected by the five-point comparison method, it may be ensured that comparison is performed between five sub-pixels, thus reducing detection error or misjudgement.

In an embodiment, detecting the first defect and the second defect of the display substrate may include:

detecting a first position coordinate set of the normal separation cells and the pixel defects on the display substrate and a second position coordinate set of the pixel defects and the defected separation cells.

In an embodiment, determining a defected separation cell according to the first defect and the second defect may include:

obtaining a position coordinate set of the pixel defects by calculating an intersection set of the first position coordinate set and the second position coordinate set;

and obtaining a position coordinate set of the defected separation cells by calculating a complementary set of the second position coordinate set according to the position coordinate set of the pixel defects.

Figure 3:
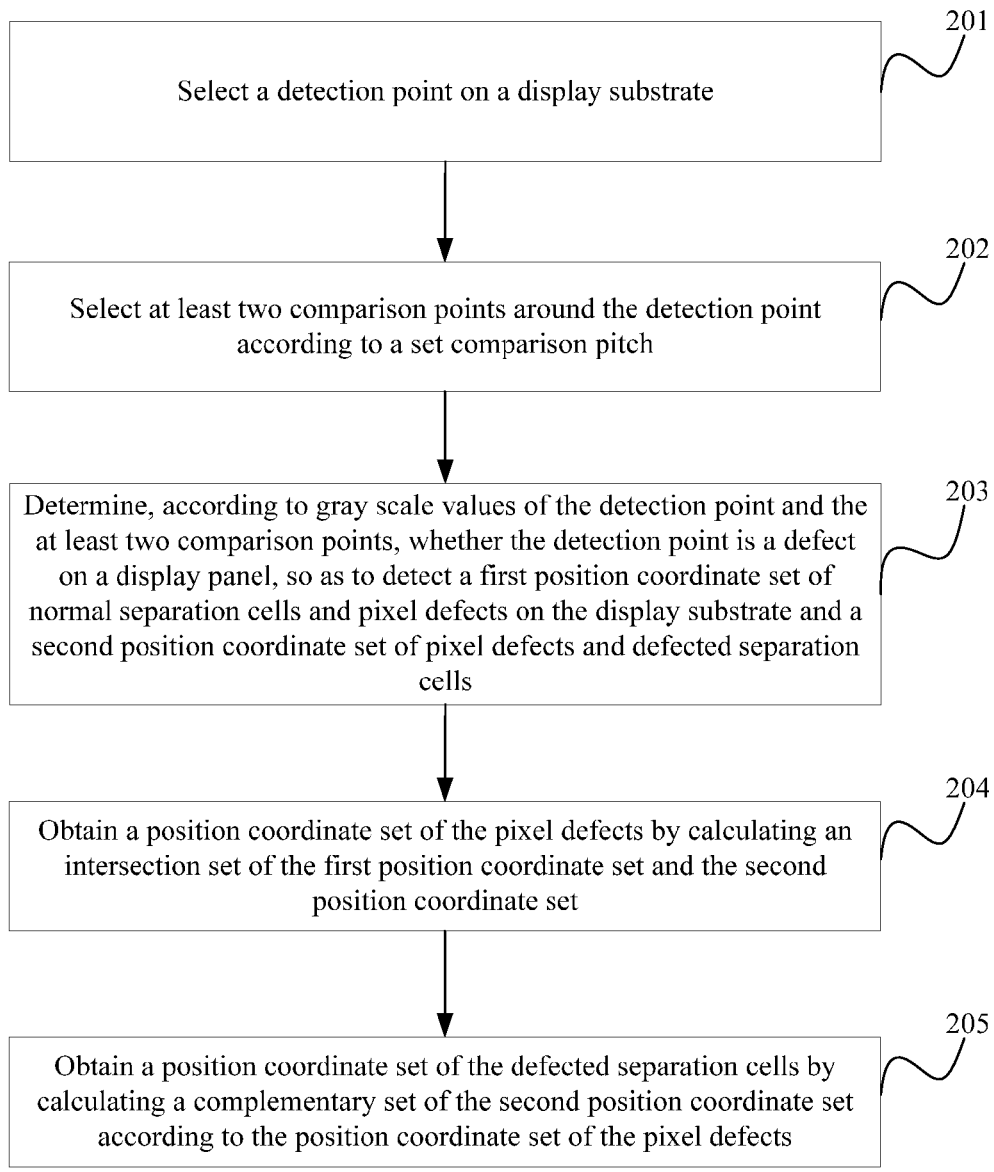
FIG. 3 is a schematic flow chart of a detection method of a display panel provided in another embodiment of the present disclosure.

Based on the above solution, FIG. 3 is a schematic flow chart of a detection method of a display panel provided in a further embodiment of the present disclosure. In the present embodiment, a virtual planar coordinate system may be established on the display substrate, and positions of the defected separation cells may be determined accurately according to position coordinates. As shown in FIG. 3, the detection method of a display panel of the present embodiment may include steps 201 to 205.

In step 201, a detection point on the display substrate is selected.

In step 202, at least two comparison points are selected around the detection point according to a set comparison pitch.

In step 203, it is determined whether the detection point is a defect on the display panel according to gray scale values of the detection point and the at least two comparison points, so as to detect a first position coordinate set of normal separation cells and pixel defects on the display substrate and a second position coordinate set of the pixel defects and defected separation cells.

Figure 4A:
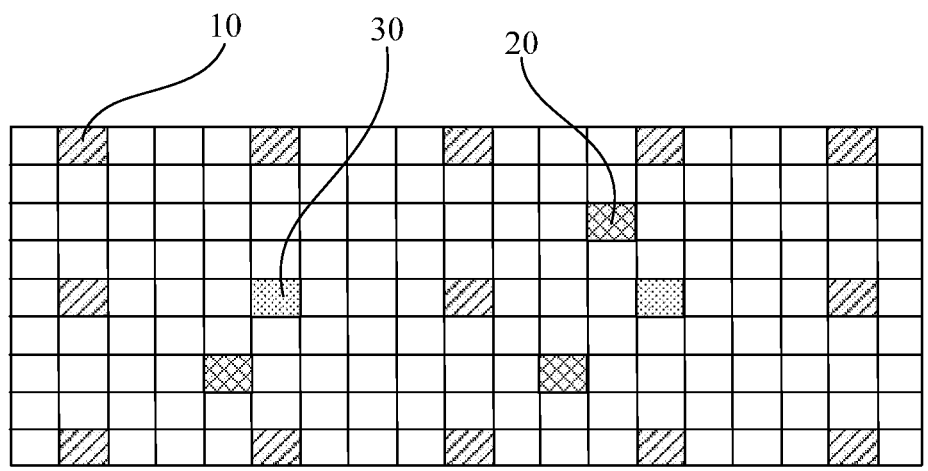
FIG. 4A to FIG. 4E are schematic basic principle diagrams for detection of a defected separation cell provided in an embodiment of the present disclosure.
Figure 4B:
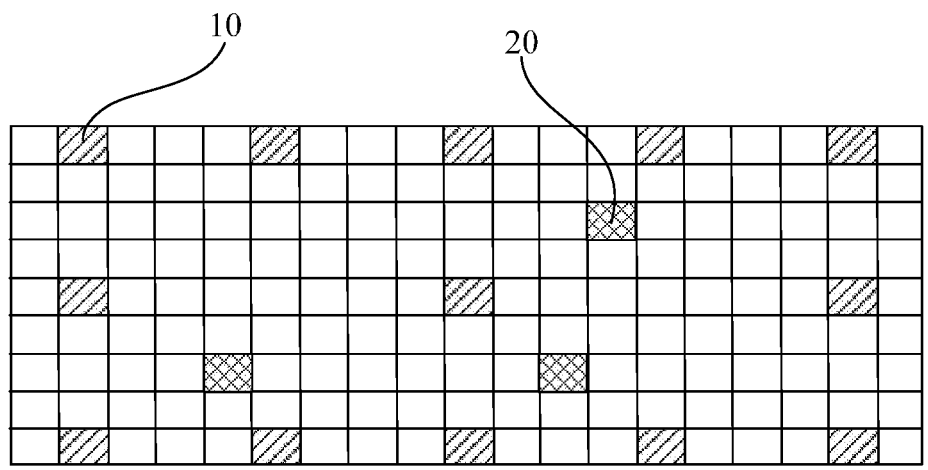

In the present embodiment, any point on the display substrate may be selected as an origin of coordinates. By way of example, the distribution of normal separation cells 10, defected separation cells 30 and pixel defects 20 on the display substrate is as shown in FIG. 4A. Referring to FIG. 4B, in the present embodiment, a standard pixel pitch is taken as a set comparison pitch, and when detecting whether a sub-pixel has a defect, upper, lower, left and right sub-pixels adjacent to the sub-pixel to be detected are taken as comparison points, so as to determine whether various sub-pixel points on the display substrate have defects by the five-point comparison method, thus detecting all pixel defects 20, such that position coordinates of the pixel defects 20 are determined in combination with the virtual planar coordinate system. In addition, since the normal separation cells 10 has a large difference in gray scale comparing to upper, lower, left and right sub-pixels adjacent thereto, the normal separation cells 10 are also detected as pixel defects, therefore position coordinates of the normal separation cells 10 can be determined in combination with the virtual planar coordinate system. In the present embodiment, the position coordinates of the pixel defects 20 and the position coordinates of the normal separation cells 10 described above form a first position coordinate set and are recorded for subsequent operation.

Figure 4C:
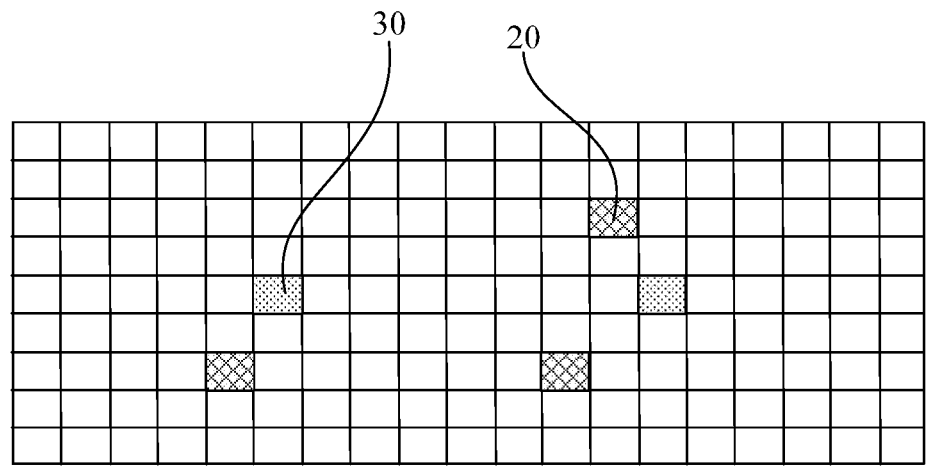

By way of example, based on FIG. 4A, referring to FIG. 4C, in the present embodiment, taking a standard separation cell pitch as a set comparison pitch, when detecting whether a sub-pixel has a defect, upper, lower, left and right sub-pixels separated from the sub-pixel to be detected by four standard pixel pitches are taken as comparison points, so as to determine whether various sub-pixels on the display substrate have defects by the five-point comparison method, thus detecting all pixel defects 20, such that position coordinates of the pixel defects 20 are determined in combination with the virtual planar coordinate system. In addition, when detecting whether a separation cell has a defect, upper, lower, left and right separation cells adjacent to the separation cell to be detected are taken as comparison points, so as to determine whether various separation cells on the display substrate have defects by the five-point comparison method, thus detecting all defected separation cells 30, such that position coordinates of the defected separation cells 30 are determined in combination with the virtual planar coordinate system; In the present embodiment, the position coordinates of the pixel defects 20 and the position coordinates of the defected separation cells 30 described above form a second position coordinate set and are recorded for subsequent operation.

In step 204, a position coordinate set of the pixel defects is obtained by calculating an intersection set of the first position coordinate set and the second position coordinate set.

Figure 4D:
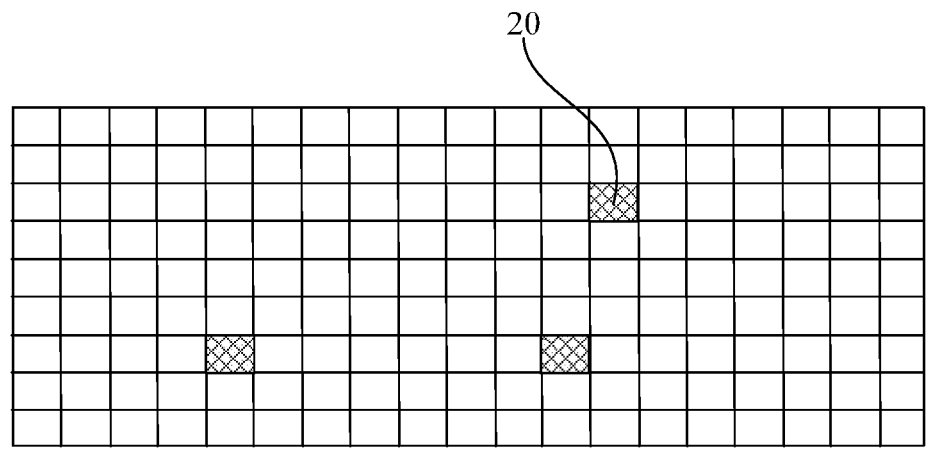

By way of example, referring to FIG. 4D, based on FIG. 4B and FIG. 4C, a position coordinate set of the pixel defects 20 may be obtained by calculating an intersection set of the first position coordinate set and the second position coordinate set.

In step 205, a position coordinate set of the defected separation cells is obtained by calculating a complementary set of the second position coordinate set according to the position coordinate set of the pixel defects.

Figure 4E:
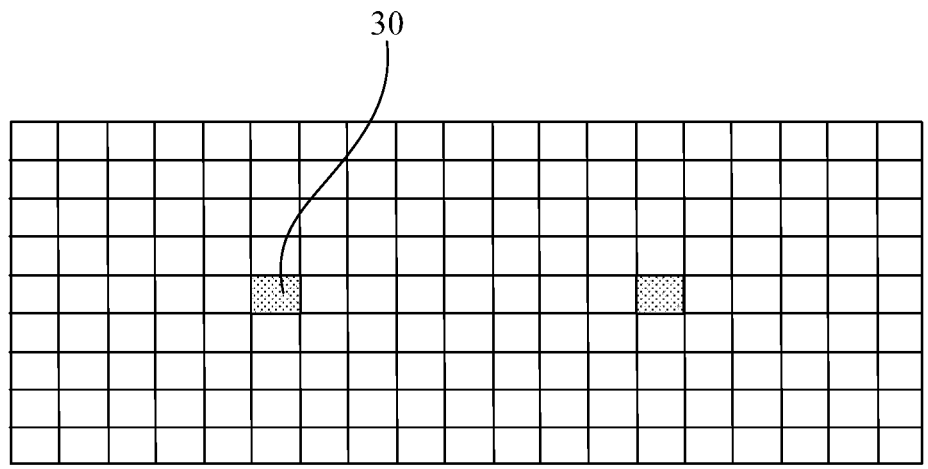

By way of example, referring to FIG. 4E, based on FIG. 4C and FIG. 4D, a position coordinate set of the defected separation cells 30 is acquired by calculating a complementary set of the second position coordinate set according to the position coordinate set of the pixel defects 20, such that positions of all defected separation cells 30 on the display substrate may be determined. In the present embodiment, the second position coordinate set is a complete set, the position coordinate set of the pixel defects is a subset of the complete set, and a set of the complete set except for the subset is the complementary set of the second position coordinate set.

With the detection method of a display panel provided in the present embodiment, not only may the defected separation cells be detected accurately according to the position coordinates, but also the pixel defects may be detected accurately, which saves a detection procedure for the defects on the display substrate and further saves the production time for a display apparatus as a whole.

In the above embodiment, the display substrate may be an array substrate or a color film substrate. For example, if the separation cell is arranged on the array substrate, the display substrate is the array substrate, and detection of a display substrate may be performed on the array substrate; and if the separation cell is arranged on the color film substrate, the display substrate is the color film substrate, and detection of a display substrate may be performed on the color film substrate. It should be noted that, a detection object of the display panel of the present disclosure is not merely limited to liquid crystal displays, the detection method of a display panel provided in the present disclosure may be employed by any other displays (such as OLED displays) with separation cells for detection of defected separation cells.

Figure 5:
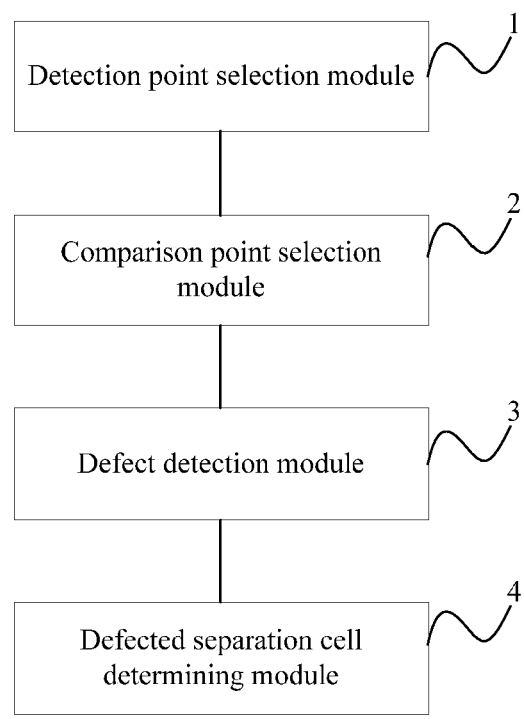
FIG. 5 is a block diagram of a detection device of a display panel provided in an embodiment of the present disclosure.

A detection device of a display panel is also provided in an embodiment of the present disclosure, and as shown in FIG. 5, the detection device of a display panel may include: a detection point selection module 1, a comparison point selection module 2, a defect detection module 3 and a defected separation cell determining module 4.

The detection point selection module 1 is configured to select a detection point on a display substrate, where the detection point corresponds to a separation cell or a pixel cell.

The comparison point selection module 2 is configured to select at least two comparison points around the detection point with a set comparison pitch.

The defect detection module 3 is configured to determine, according to gray scale values of the detection point and the at least two comparison points, whether the detection point is a defect on the display panel so as to detect a first defect and a second defect of the display substrate, where the second defect includes a pixel defects and a defected separation cell.

The defected separation cell determining module 4 is configured to determine the defected separation cell according to the first defect and the second defect.

In the present embodiment, with the above comparison method of the present embodiment, normal separation cells together with pixel defects are detected to be defects on the display substrate. A separation cell may be a support post or a spacer, and the separation cell may be arranged in a liquid crystal cell of a liquid crystal display. A defected separation cell refers to the event where a separation cell is totally lost or the separation cell is incomplete.

In addition, not only may the pixel defects be detected to be the first defects, but also some normal separation cells may also be detected to be the first defects, and the second defects include pixel defects and defected separation cells, therefore, the defected separation cell determining module 4 may determine the defected separation cells directly by a simple comparison and calculation of the first defects and the second defects.

In the detection method of a display panel provided in the present embodiment, based on the comparison method for automatic optic inspection, a first detect, including normal separation cells and pixel defects, and a second detect, including pixel defects and defected separation cells, of the display substrate may be detected by controlling the comparison pitch in the comparison method, and then, according to the first defect and the second defect, that is, a comparison between the first defect and the second defect, defected separation cells may be determined, which avoids comparing a standard support post distribution diagram with a detected image, thus reducing a large amount of image data processing operations, such that the defected separation cells may be detected efficiently, computer resources may be saved and the production time for a display apparatus may be saved.

Figure 6:
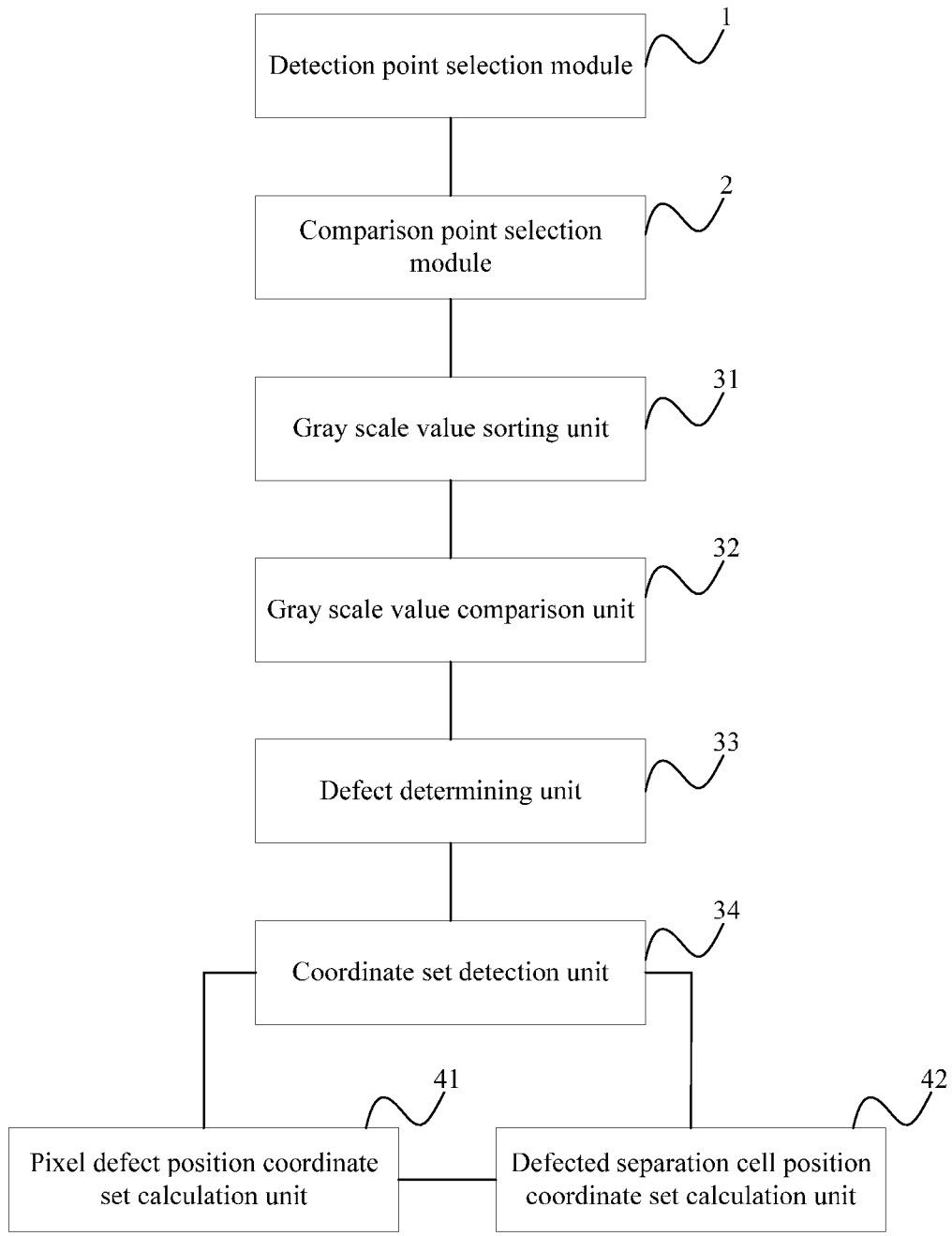
FIG. 6 is a block diagram of a detection device of a display panel provided in a further embodiment of the present disclosure.

FIG. 6 is a structural block diagram of a detection device of a display panel provided in a further embodiment of the present disclosure. As shown in FIG. 6, the defect detection module includes: a gray scale value sorting unit 31, a gray scale value comparison unit 32, a defect determining unit 33 and a coordinate set detection unit 34.

The gray scale value sorting unit 31 is configured to sort the gray scale values of the detection point and four comparison points by size.

The gray scale value comparison unit 32 is configured to select the third gray scale value as a standard value and compare the gray scale value of the detection point with the standard value.

The defect determining unit 33 is configured to determine that the detection point is the defect on the display panel, if the difference between the gray scale value of the detection point and the standard value is greater than a set value.

The coordinate set detection unit 34 is configured to detect a first position coordinate set of the normal separation cells and the pixel defects on the display substrate and a second position coordinate set of the pixel defects and the defected separation cells.

The above defect determining unit 33 is also configured to determine that the detection point is the first defect on the display panel, when the set comparison pitch is a standard pixel pitch; and determine that the detection point is the second defect on the display panel, when the set comparison pitch is a standard separation cell pitch.

In an embodiment, the defect detection module also includes a gray scale value acquisition module. The gray scale acquisition module is configured to obtain a gray scale distribution diagram by scanning the display panel and obtain the gray scale value of the detection point and the gray scale values of the at least two comparison points from the gray scale distribution diagram.

The standard pixel pitch may be a pitch between two adjacent sub-pixels of periodically disposed RGB or WRGB. The standard separation cell pitch is determined by the number of sub-pixels between two adjacent separation cells as well as the standard pixel pitch. For example, when three sub-pixels are arranged between the two adjacent separation cells, the standard separation cell pitch is four times of the standard pixel pitch, such that when separation cells are detected by the five-point comparison method, it may be ensured that comparison is performed between five separation cells, and when sub-pixels are detected by the five-point comparison method, it may be ensured that comparison is performed between five sub-pixels, thus reducing detection error or misjudgement.

Optionally, referring to FIG. 6, the defected separation cell determining module may include: a pixel defect position coordinate set calculation unit 41 and a defected separation cell position coordinate set calculation unit 42.

The pixel defect position coordinate set calculation unit 41 is configured to acquire a position coordinate set of the pixel defects by calculating an intersection set of the first position coordinate set and the second position coordinate set.

The defected separation cell position coordinate set calculation unit 42 is configured to acquire a position coordinate set of the defected separation cells by calculating a complementary set of the second position coordinate set according to the position coordinate set of the pixel defects.

By way of example, in the present embodiment, a virtual planar coordinate system may be established on the display substrate, and positions of the defected separation cells may be determined accurately according to position coordinates.

The detection point selection module 1 may select a detection point first, and the comparison point selection module 2 selects four comparison points upper, lower, left and right to the detection point respectively with a fixed comparison pitch; and during calculation, the gray scale value sorting unit 31 sorts gray scale values of the detection point and the four comparison points from small to large (or from large to small) according to the size of the gray scale values, the gray scale value comparison unit 32 takes a gray scale value of a point sorted in the middle as a standard value and then compares the gray scale value of the detection point with the standard value, if an absolute value of the difference between the gray scale value of the detection point and the standard value is greater than a set value, the defect determining unit 33 considers the detection point as the defect on the display substrate, and if the absolute value of the difference between the gray scale value of the detection point and the standard value is less than or equal to the set value, the detection point is normal.

Taking a standard pixel pitch as a set comparison pitch, when detecting whether a sub-pixel has a defect, the coordinate set detection unit 34 takes upper, lower, left and right sub-pixels adjacent to the sub-pixel to be detected as comparison points so as to determine whether various sub-pixels on the display substrate have defects by the five-point comparison method, thus detecting all pixel defects, such that position coordinates of the pixel defects are determined in combination with the virtual planar coordinate system; in addition, since the normal separation cells differ too much from upper, lower, left and right sub-pixels adjacent thereto in gray scale, the normal separation cells are also detected as pixel defects by the coordinate set detection unit 34, such that position coordinates of the normal separation cells are determined in combination with the virtual planar coordinate system.

Taking a standard separation cell pitch as a set comparison pitch, when detecting whether a sub-pixel has a defect, the coordinate set detection unit 34 takes upper, lower, left and right sub-pixels separated from the sub-pixel to be detected by four standard pixel pitch as comparison points so as to determine whether various sub-pixels on the display substrate have defects by the five-point comparison method, thus detecting all pixel defects, such that position coordinates of the pixel defects are determined in combination with the virtual planar coordinate system; in addition, when detecting whether a separation cell has a defect, the coordinate set detection unit 34 takes upper, lower, left and right separation cells adjacent to the separation cell to be detected as comparison points so as to determine whether various separation cells on the display substrate have defects by the five-point comparison method, thus detecting all defected separation cells, such that position coordinates of the defected separation cells are determined in combination with the virtual planar coordinate system;

The pixel defect position coordinate set calculation unit 41 may acquire a position coordinate set of the pixel defects by calculating an intersection set of the first position coordinate set and the second position coordinate set.

The defected separation cell position coordinate set calculation unit 42 acquires a position coordinate set of the defected separation cells by calculating a complementary set of the second position coordinate set according to the position coordinate set of the pixel defects, such that positions of all defected separation cells on the display substrate may be determined. In the present embodiment, the second position coordinate set is a complete set, the position coordinate set of the pixel defects is a subset of the complete set, and a set of the complete set except for the subset is the complementary set of the second position coordinate set.

With the detection device of a display panel provided in the present embodiment, not only may the defected separation cells be detected accurately according to the position coordinates, but also the pixel defects may be detected accurately, which saves a detection procedure for the defects on the display substrate and further saves the production time for a display apparatus as a whole.

An automatic optic inspection apparatus is also provided in an embodiment of the present disclosure, including a detection device of a display panel. The detection device of a display panel includes: a detection point selection module, a comparison point selection module, a defect detection module and a defected separation cell determining module.

The detection point selection module is configured to select a detection point on a display substrate, where the detection point corresponds to a separation cell or a pixel cell.

The comparison point selection module is configured to select four comparison points around the detection point with a set comparison pitch, where the set comparison pitch includes a standard pixel pitch and a standard separation cell pitch.

The defect detection module includes a coordinate set detection unit. The coordinate set detection unit is configured to detect a first position coordinate set of the normal separation cells and the pixel defects on the display substrate and a second position coordinate set of the pixel defects and the defected separation cells.

The defected separation cell determining module includes a pixel defect position coordinate set calculation unit and a defected separation cell position coordinate set calculation unit. The pixel defect position coordinate set calculation unit is configured to acquire a position coordinate set of the pixel defects by calculating an intersection set of the first position coordinate set and the second position coordinate set. The defected separation cell position coordinate set calculation unit is configured to acquire a position coordinate set of the defected separation cells by calculating a complementary set of the second position coordinate set according to the position coordinate set of the pixel defects.

By way of example, the automatic optic inspection apparatus detects a first position coordinate set of normal separation cells and pixel defects on the display substrate first by taking the standard pixel pitch as the comparison pitch of the five-point comparison method, and detects a second position coordinate set of pixel defects and defected separation cells on the display substrate by taking the standard separation cell pitch as the comparison pitch of the five-point comparison method; the automatic optic inspection apparatus acquires a position coordinate set of the pixel defects by calculating an intersection set of the first position coordinate set and the second position coordinate set; and finally, the automatic optic inspection apparatus acquires a position coordinate set of the defected separation cells by calculating a complementary set of the second position coordinate set according to the position coordinate set of the pixel defects.

The automatic optic inspection apparatus provided in the present embodiment includes the detection device of a display panel provided in the above embodiment of the present disclosure and has corresponding functions and beneficial effects. With reference to the above embodiments, contents not specified in the present embodiment will not be described redundantly here.

A detection method of a display panel is also provided in the present disclosure for detecting a pixel cell defect and a support post loss in a display panel.

Figure 7:
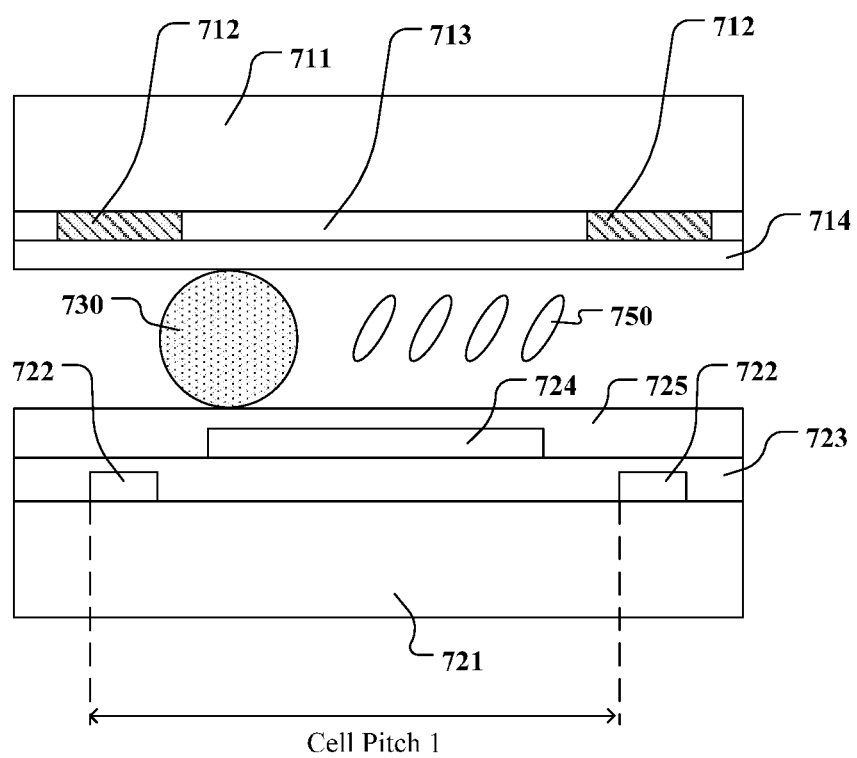
FIG. 7 is a cross-sectional view of a part of a region of the display panel.

FIG. 7 is a cross-sectional view of a part of a region of the display panel. As shown in FIG. 7, the display panel includes an array substrate, a color film substrate and liquid crystals 750 located between the array substrate and the color film substrate. A support post 730 is arranged between the array substrate and the color film substrate. The support post 730 maintains a gap between the array substrate and the color film substrate, that is, maintains the stability of the display panel. The support post 730, for example, is a ball spacer made from resin or glass fiber. In another embodiment, the support post 730 is column-shaped.

Figure 8:
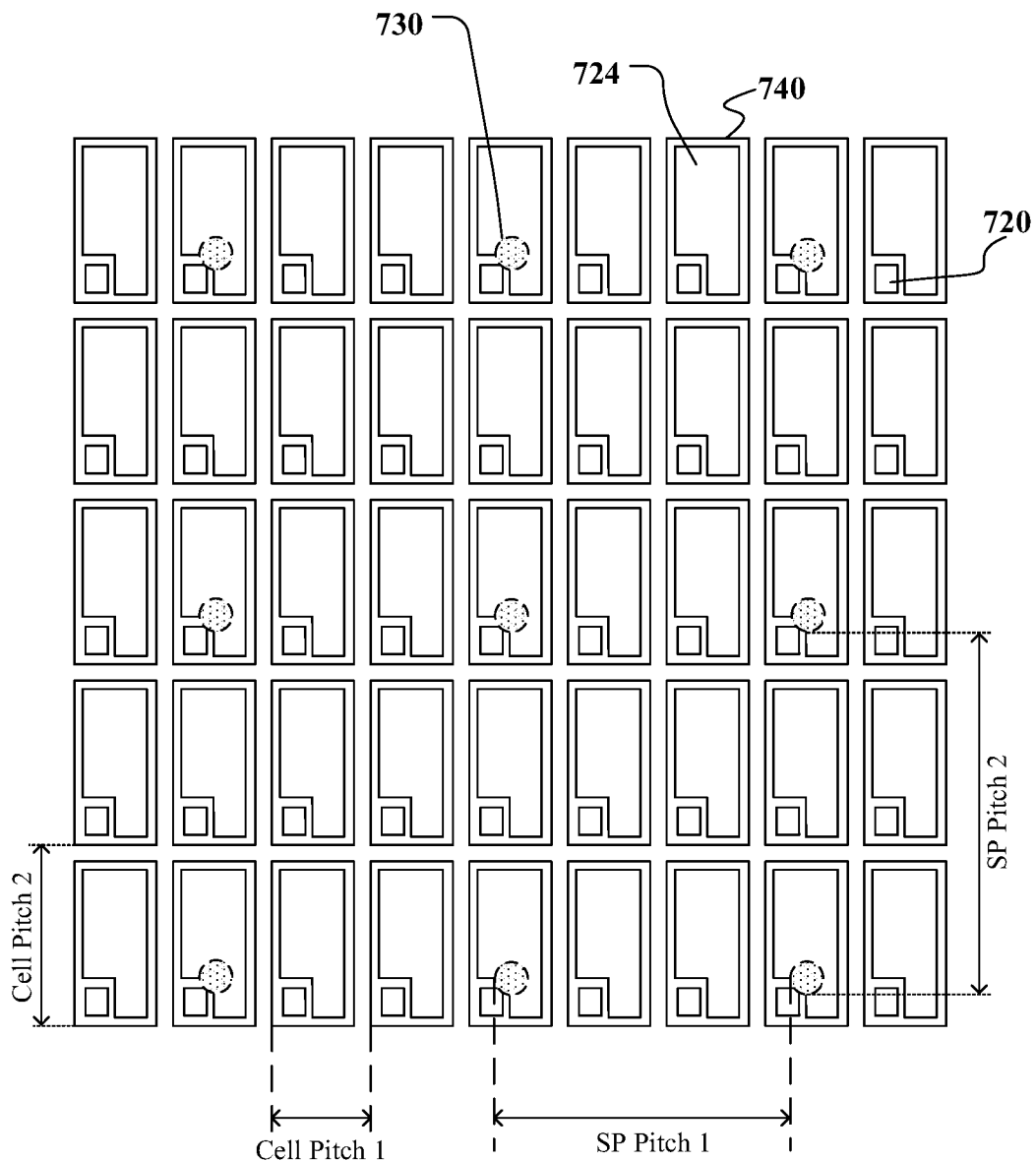
FIG. 8 is a top view of a support post and an array substrate.

FIG. 8 is a top view of the support post 730 and the array substrate. As shown in FIG. 7 and FIG. 8, the array substrate includes a support substrate 721, and a plurality of pixel cells 740 are arranged on the support substrate 721. Each pixel cell 740 includes a thin film transistor 720 and a pixel electrode 724. The thin film transistor 720 includes a gate electrode 722, a source electrode (not shown), and a drain electrode (not shown). An insulation layer 723 is provided between the gate electrode 722 and the pixel electrode 724. The array substrate also includes an orientation layer 725. In an embodiment, a planarization layer is also provided between the pixel electrode 724 and the orientation layer 725. The color film substrate includes a support substrate 711. A color resist layer (color filter layer) 713 and a black matrix 712 are provided on the surface, which is opposite to the array substrate, of the support substrate 711. The color film substrate also includes an orientation layer 714. In an embodiment, a planarization layer is also provided between the color resist layer (color filter layer) 713 and the orientation layer 714. The liquid crystals 750 are arranged between the orientation layer 725 and the orientation layer 714.

In an embodiment, the color resist layer 713 includes a red color resist, a green color resist, and a blue color resist. Each of the red color resist, the green color resist, and the blue color resist corresponds to one of the pixel cells 740. The red color resist, the green color resist, and the blue color resist are separated from each other by the black matrix 712. In another embodiment, the color resist layer 713 includes a red color resist, a green color resist, a blue color resist and a white color resist. Similarly, each of the red color resist, the green color resist, the blue color resist, and the white color resist corresponds to one of the pixel cells 740. In a further embodiment, the color resist layer 713 includes a red color resist, a green color resist, a blue color resist and a yellow color resist.

As shown in FIG. 8, the pixel cells 740 of the array substrate are arranged in an array, and a cell pitch is a pitch between standard RGBs. The cell pitch may include a cell pitch 1 in a first direction and a cell pitch 2 in a second direction. In the present embodiment, the pixel cell 740 is a rectangle, longer sides of the rectangle extend in the first direction, and shorter sides of the rectangle extend in the second direction. The support post 730 is arranged above the pixel cell. One end of the support post 730 is in contact with the orientation layer 725, and the other end of the support post 730 is in contact with the orientation layer 714. Nine support posts 730 are illustrated schematically in FIG. 8. In fact, the number of the support posts 730 is much less than the number of the pixel cells. A PS pitch is a pitch between standard PSes. Generally, the PS pitch is n times of the cell pitch. n is an integer and greater than or equal to 2. The PS pitch may include a PS pitch 1 in a first direction and a PS pitch 2 in a second direction. A position where the support post 730 is arranged may be referred to as a separation cell.

The display panel may have a plurality of types of defects, for example, pixel cell defect (defect) and support post loss (PS lose). For example, if the pixel electrode in the pixel cell is damaged, a position where the support post is predetermined to be arranged is not successfully provided with the support post. Therefore, the separation cell includes normal separation cells and defected separation cells. The pixel cell includes normal pixel cells and pixel defects.

A detection method of a display panel includes the following steps.

In a first step, a plurality of first comparison points are selected for a detection point.

The detection method of a display panel provided in the present disclosure is accomplished by virtue of an automatic optic inspection (AOI) apparatus. The automatic optic inspection apparatus includes a plurality of charge coupled devices (CCD). A gray scale distribution diagram is generated by scanning a pixel cell array of an array substrate with the charge coupled devices.

Figure 9:
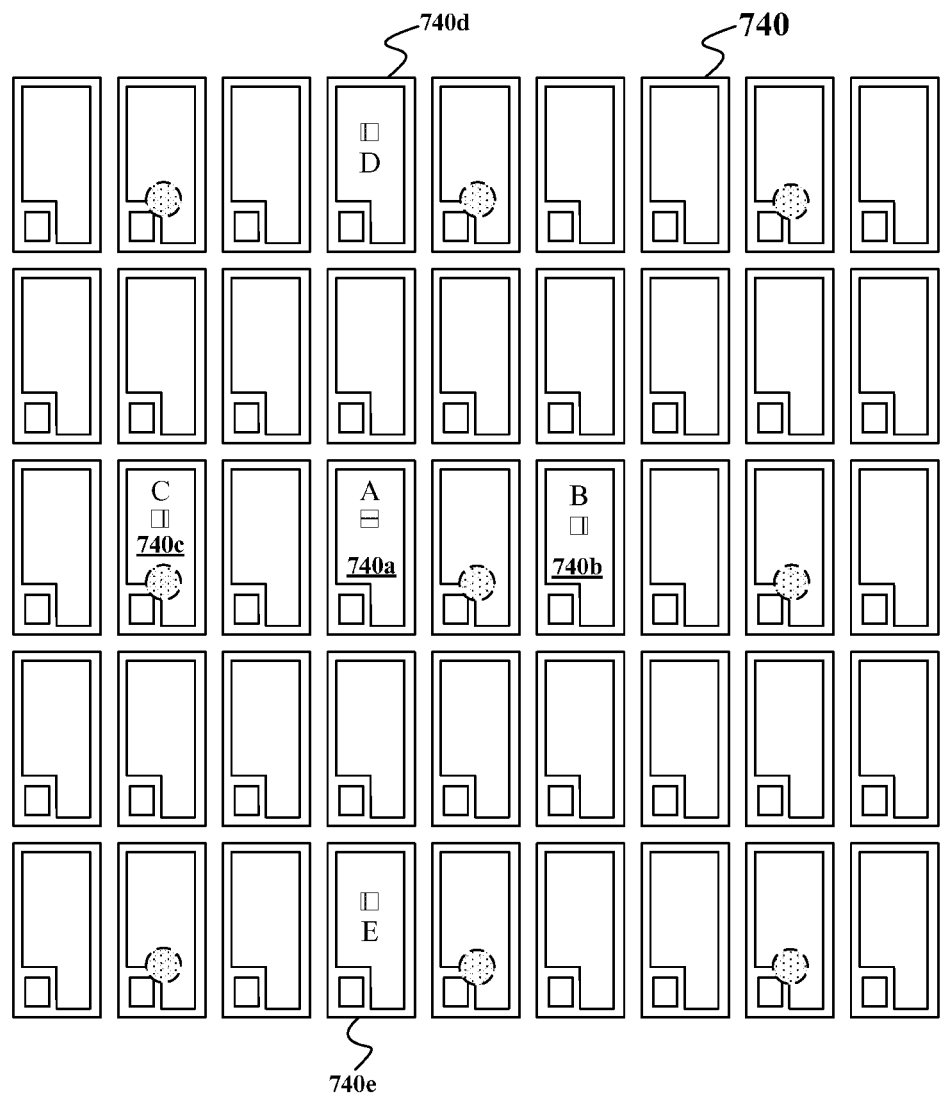
FIG. 9 is a schematic diagram of detection points and comparison points according to an embodiment of the present disclosure.

The detection points and the comparison points are dependent on the resolution of the charge coupled devices. For charge coupled devices with higher resolution, after the pixel cell array is scanned by the charge coupled devices, one pixel cell occupies a plurality of gray scale cells in the gray scale distribution diagram. At this time, the size of the detection point is less than the size of the pixel cell. As shown in FIG. 9, a detection point A is a position in a pixel cell 740*a*. Four first comparison points B, C, D and E are selected for the detection point A. The first comparison point B is located in a pixel cell 740*b*, the first comparison point C is located in a pixel cell 740*c*, the first comparison point D is located in a pixel cell 740*d*, and the first comparison point E is located in a pixel cell 740*e*. The position of the comparison points relative to the pixel cell where they are located is similar to or the same as the position of the detection point relative to the pixel cell where it is located. That is to say, the position of the detection point A relative to the pixel cell 740*a* is similar to or the same as the position of the first comparison point B relative to the pixel cell 740*b*, and the position of the detection point A relative to the pixel cell 740*a* is similar to or the same as the position of the first comparison point E relative to the pixel cell 740*e*. It may be determined whether the detection point has a defect by comparing a gray scale of the detection point with gray scales of corresponding points in other pixel cells. In an embodiment, first comparison points are determined for the detection point by a pre-set first comparison pitch, that is, the first comparison pitch is a distance between each first comparison point and the detection point. The pre-set first comparison pitch, for example, is one or more cell pitches.

Figure 10:
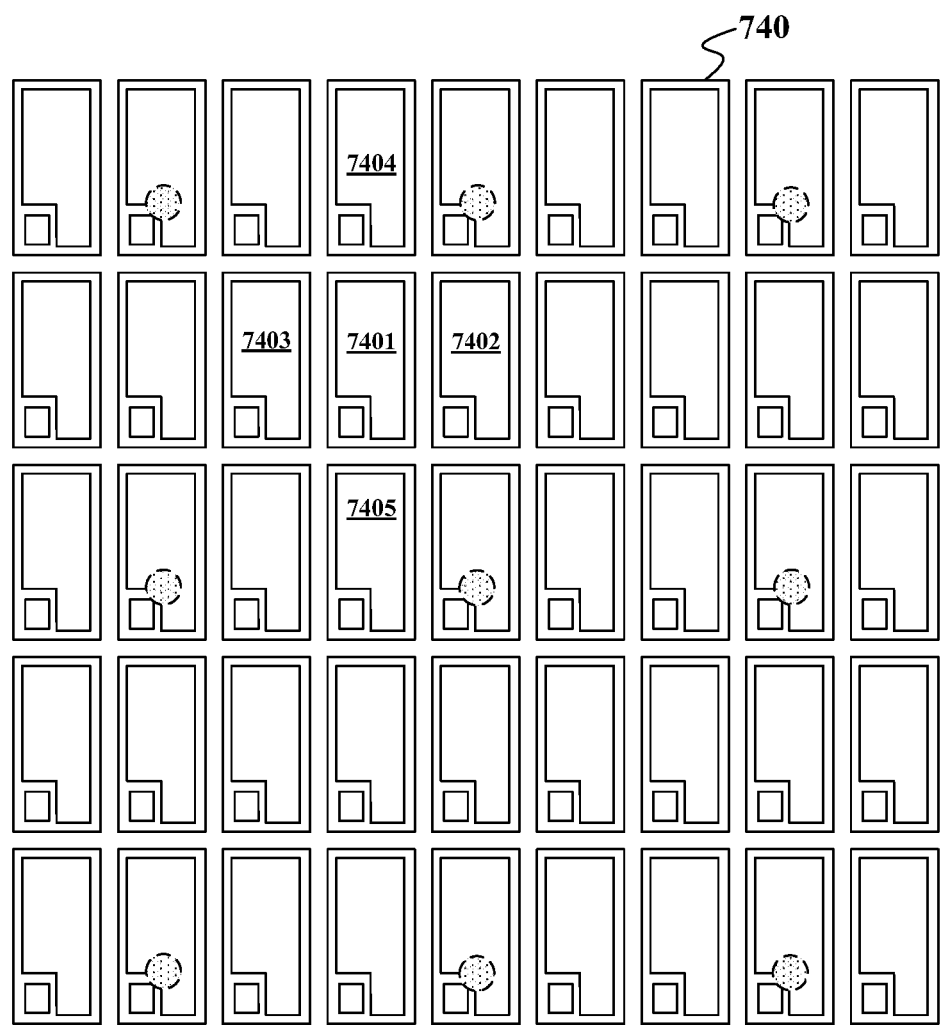
FIG. 10 is a schematic diagram of detection points and comparison points according to another embodiment of the present disclosure.

For charge coupled devices with lower resolution, after the pixel cell array is scanned by the charge coupled devices, one pixel cell occupies one gray scale cell in the gray scale distribution diagram. At this time, the detection point and the plurality of first comparison points are all pixel cells of the array substrate. Referring to FIG. 10, the detection point is a pixel cell 7401, and the four first comparison points are pixel cells 7402 to 7405. Similarly, first comparison points are determined for the detection point by a pre-set first comparison pitch, that is, the first comparison pitch is a distance between each first comparison point and the detection point. The pre-set first comparison pitch, for example, is one or more cell pitches.

In a second step, a gray scale value of the detection point and gray scale values of the plurality of first comparison points are obtained by the automatic optic inspection apparatus. The gray scale value of the detection point and the gray scale values of the plurality of first comparison points may be obtained from the gray scale distribution diagram.

Taking the charge coupled devices with lower resolution as an example, after the pixel cell array of the array substrate is scanned by the charge coupled devices, each pixel cell has one gray scale value read from the gray scale distribution diagram. The pixel cells of the array substrate may be classified into four types: a pixel cell where no support post is planned to be arranged and there is no defect (marked as a first pixel cell), a pixel cell where no support post is planned to be arranged but there is a defect (marked as a second pixel cell), a pixel cell where a support post is planned to be arranged and the support post is normal (marked as a third pixel cell) and a pixel cell where a support post is planned to be arranged but the support post is lost (marked as a fourth pixel cell). The pixel cell where a support post is planned to be arranged but the support post is lost is a defected separation cell. The pixel cell where a support post is planned to be arranged and the support post is normal is a normal separation cell.

In a third step, a first standard value is generated according to the gray scale value of the detection point and the gray scale values of the plurality of first comparison points.

In an embodiment, a gray scale value of the detection point 7401 and gray scale values of the four first comparison points 7402, 7403, 7404 and 7405 are sorted by size, and a gray scale value sorted in the third is selected as the first standard value. For example, the gray scale value of the detection point 7401 is 140, the gray scale values of the four first comparison points 7402, 7403, 7404 and 7405 are 130, 145, 150 and 160 respectively, and therefore, the first standard value is 145.

In a fourth step, it is determined whether an absolute value of the difference between the gray scale value of the detection point and the first standard value is greater than a first threshold value, and if the absolute value of the difference between the gray scale value of the detection point and the first standard value is greater than the first threshold value, the detection point belongs to the first set.

If the absolute value of the difference between the gray scale value of the detection point and the first standard value is less than or equal to the first threshold value, the detection point is considered to be normal, that is, there is no defect. As shown in FIG. 10, the absolute value of the difference between the gray scale value of the detection point (the pixel cell 7401) and the first standard value is less than or equal to the first threshold value, which indicates that the pixel cell 7401 has better consistency with surrounding pixel cells, and is thus considered to be a normal pixel cell.

If the absolute value of the difference between the gray scale value of the detection point and the first standard value is greater than the first threshold value, the detection point may have a defect. The pixel cell 7401 may be either a pixel cell not provided with a support post (as shown in FIG. 10), or a pixel cell provided with a support post (as shown in FIG. 11).

As shown in FIG. 10, the pixel cell 7401, as the detection point, is a pixel cell not provided with a support post, the absolute value of the difference between the gray scale value of the pixel cell 7401 and the first standard value being greater than the first threshold value indicates that the pixel cell 7401 has no consistency with surrounding pixel cells, and therefore, the pixel cell 7401 is considered to have a defect, that is, the pixel cell 7401 is the pixel cell where no support post is planned to be arranged but there is a defect (the second pixel cell).

Figure 11:
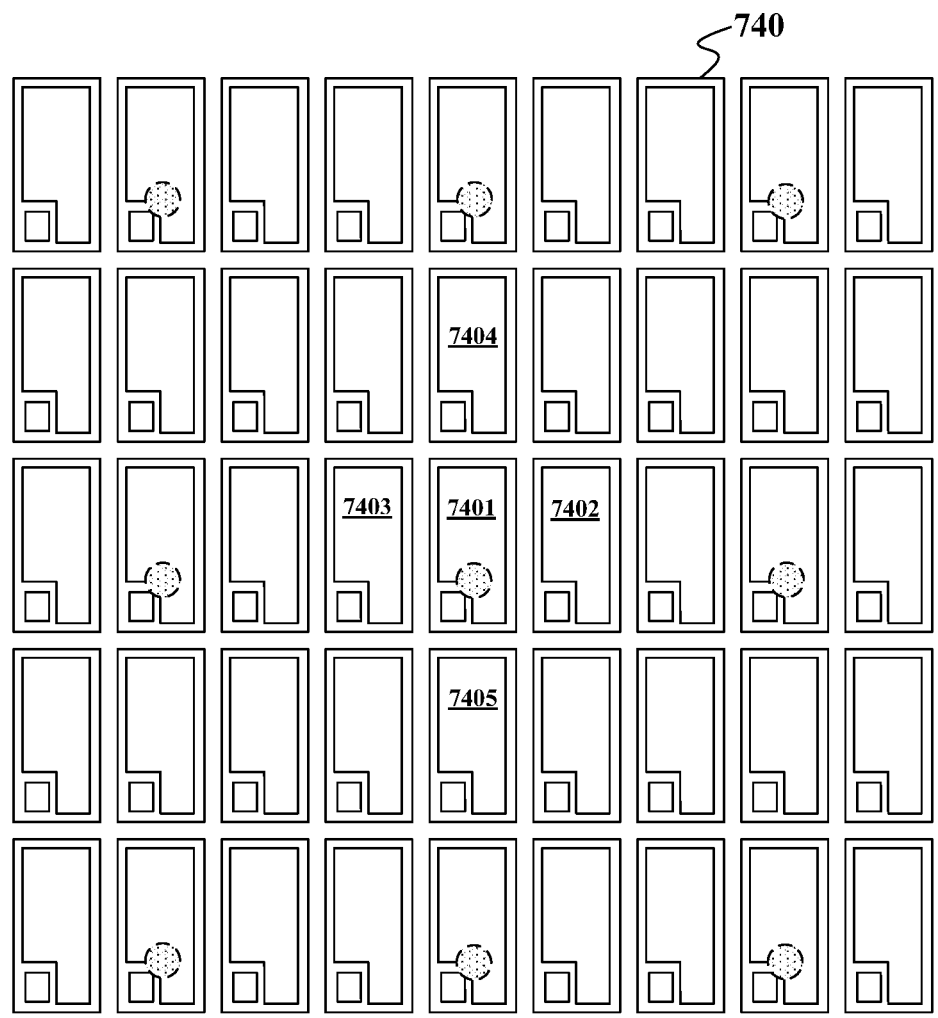
FIG. 11 is a schematic diagram of detection points and comparison points according to an embodiment of the present disclosure.

As shown in FIG. 11, the pixel cell 7401, as the detection point, is a pixel cell provided with a support post, and since the number of the support posts is much less than the number of the pixel cells, selected first comparison pixel cells (pixel cells 7402, 7403, 7404 and 7405) are all pixel cells not provided with a support post. In this way, the absolute value of the difference between the gray scale value of the pixel cell 7401 and the first standard value may also be greater than the first threshold value, and therefore, the pixel cell where a support post is planned to be arranged and the support post is normal (marked as the third pixel cell) may also belong to the first set when it is selected as the detection point.

In a fifth step, a plurality of second comparison points is selected for the detection point. In an embodiment, second comparison points are determined for the detection point by a pre-set second comparison pitch, that is, the second comparison pitch is a distance between each second comparison point and the detection point. The pre-set second comparison pitch, for example, is one or more PS pitches.

In a sixth step, gray scale values of the plurality of second comparison points are obtained. The gray scale values of the plurality of second comparison points are also obtained from the gray scale distribution diagram.

In a seventh step, a second standard value is generated according to the gray scale value of the detection point and the gray scale values of the plurality of second comparison points.

In the present embodiment, the gray scale value of the detection point and gray scale values of four second comparison points are sorted by size, and a gray scale value sorted in the third is selected as the second standard value.

In an eighth step, it is determined whether an absolute value of the difference between the gray scale value of the detection point and the second standard value is greater than a second threshold value, and if the absolute value of the difference between the gray scale value of the detection point and the second standard value is greater than the second threshold value, the detection point belongs to the second set.

If the absolute value of the difference between the gray scale value of the detection point and the second standard value is less than or equal to the second threshold value, the detection point is considered to be normal, that is, there is no defect.

When the pixel cell 7401, as the detection point, is a pixel cell not provided with a support post, since the PS pitch is an integer multiple of the cell pitch, selected second comparison points all may be considered to be pixel cells not provided with a support post. If the absolute value of the difference between the gray scale value of the detection point and the second standard value is less than or equal to the second threshold value, the detection point is considered to be the pixel cell where no support post is planned to be arranged but there is no defect (the first pixel cell). If the absolute value of the difference between the gray scale value of the detection point and the second standard value is greater than the second threshold value, the detection point is considered to be the pixel cell where no support post is planned to be arranged but there is a defect (the second pixel cell).

When the pixel cell 7401, as the detection point, is the pixel cell where a support post is planned to be arranged but the support post is lost (the fourth pixel cell), since the second comparison points are selected according to one or more PS pitches, the second comparison points are all pixel cells where a support post is planned to be arranged. If the absolute value of the difference between the gray scale value of the detection point and the second standard value is less than or equal to the second threshold value, it indicates that the support post of the detection point is lost.

In summary, if the absolute value of the difference between the detection point and the first standard value is greater than the first threshold value, it indicates that the detection points may be the pixel cell where no support post is planned to be arranged but there is a defect (the second pixel cell) and the pixel cell where a support post is planned to be arranged and the support post is normal (the third pixel cell). If the absolute value of the difference between the gray scale value of the detection point and the second standard value is greater than the second threshold value, it indicates that the detection points may be the pixel cell where no support post is planned to be arranged but there is a defect (the second pixel cell) and the pixel cell where a support post is planned to be arranged but the support post is lost (the fourth pixel cell). If the absolute value of the difference between the gray scale value of the detection point and the first standard value is greater than the first threshold value and the absolute value of the difference between the gray scale value of the detection point and the second standard value is greater than the second threshold value, that is, the detection point belongs to the first set and the second set, it indicates that the detection point is a pixel cell having a defect.

The loss of the support post of the display panel may be determined further with the above method. A method of determining loss of a support post is as follows.

Firstly, a gray scale distribution diagram is obtained by scanning a display panel with an automatic optic inspection apparatus. In an embodiment, one pixel cell occupies one gray scale cell in the gray scale distribution diagram. All pixel cells are used as a complete set.

Then, taking each pixel cell as the detection point, the first step to the fourth step described above are executed to obtain a first set.

Next, taking each pixel cell as the detection point, the fifth step to the eighth step described above are executed to obtain a second set.

Subsequently, a third set is obtained by calculating an intersection set of the first set and the second set. The third set is defected pixel cells.

After this, a fourth set is obtained by subtracting the third set from the second set. The fourth set is positions where the support post loss occurs.

The above method may also be described as follows. A detection method of a display panel including a plurality of separation cells and a plurality of pixel cells includes the following steps:

obtaining a gray scale distribution diagram by scanning a display panel with an automatic optic inspection apparatus, where the gray scale distribution diagram includes a plurality of gray scale points, and the plurality of gray scale points are in one-to-one correspondence with the plurality of separation cells and the plurality of pixel cells;

taking each gray scale point as a detection point, determining a first set from the plurality of gray scale points according to a gray scale value of the detection point and gray scale values of a plurality of first comparison points, and determining a second set from the plurality of gray scale points according to the gray scale value of the detection point and gray scale values of a plurality of second comparison points;

determining gray scale points belonging to both the first set and the second set as a third set; and determining a defected pixel cell according to the gray scale points in the third set.

It is determined whether the detection point belongs to the first set by the following steps: obtaining a first standard value according to the gray scale value of the detection point and the gray scale values of the plurality of first comparison points; and if an absolute value of the difference between the gray scale value of the detection point and the first standard value is greater than a first threshold value, determining that the detection point belongs to the first set, and it is determined whether the detection point belongs to the second set by the following steps: obtaining a second standard value according to the gray scale value of the detection point and the gray scale values of the plurality of second comparison points; and if an absolute value of the difference between the gray scale value of the detection point and the second standard value is greater than a second threshold value, determining that the detection point belongs to the second set.

In an embodiment, the plurality of first comparison points are determined according to a first comparison pitch, the plurality of second comparison points are determined according to a second comparison pitch, the first comparison pitch is one or more standard pixel pitches, the second comparison pitch is one or more standard separation cell pitches, and the standard separation cell pitch is n times of the standard pixel pitch, where n is an integer greater than or equal to 2.

In an embodiment, the number of the plurality of first comparison points is 4, the number of the plurality of second comparison points is 4.

A method of acquiring the first standard value includes: sorting the gray scale value of the detection point and gray scale values of the four first comparison points by size so as to obtain first sorting; and taking the third-sized gray scale value in the first sorting as the first standard value, and a method of acquiring the second standard value includes: sorting the gray scale value of the detection point and gray scale values of the four second comparison points by size so as to obtain second sorting; and taking a third-sized gray scale value in the second sorting as the second standard value.

In an embodiment, the detection method also includes: obtaining a fourth set by removing gray scale points belonging to both the second set and the third set from the second set; and determining a defected separation cell according to gray scale points in the fourth set. In the defected separation cell, a support post is planned to be arranged, but the support post is not successfully arranged.

It should be noted that the above descriptions are merely some embodiments of the present disclosure and technical principles applied. It should be understood by persons skilled in the art that the present disclosure is not limited to the particular embodiments described herein. Persons skilled in the art can make various obvious changes, adjustments, and replacements without departing from the protection scope of the present disclosure. Therefore, although the present disclosure has been described in detail through the foregoing embodiments, the present disclosure is not limited to these embodiments, and can also include many other equivalent embodiments without departing from the concept of the present disclosure. The scope of the present disclosure is subject to the appended claims.

What is claimed is:

1. A detection method of a display panel, comprising:
   selecting a detection point on a display substrate, wherein the detection point corresponds to a separation cell or a pixel cell;
   selecting at least two comparison points for the detection point according to a set comparison pitch;
   determining, according to a gray scale value of the detection point and gray scale values of the at least two comparison points, whether the detection point is a defect on the display panel, so as to detect a first defect and a second defect of the display substrate, the second defect comprising a pixel defect and a defected separation cell; and
   determining the defected separation cell according to the first defect and the second defect.

2. The detection method of the display panel according to claim 1, wherein the number of the comparison points is 4, and the determining, according to a gray scale value of the detection point and gray scale values of the at least two comparison points, whether the detection point is a defect on the display panel comprises:
   sorting the gray scale value of the detection point and gray scale values of four comparison points by size;
   selecting a third gray scale value in the sorting as a standard value, and comparing the gray scale value of the detection point with the standard value; and
   if a difference between the gray scale value of the detection point and the standard value is greater than a set value, determining that the detection point is the defect on the display panel.

3. The detection method of the display panel according to claim 2, wherein the determining that the detection point is the defect on the display panel comprises:
   when the set comparison pitch is a standard pixel pitch, determining that the detection point is the first defect on the display panel; and
   when the set comparison pitch is a standard separation cell pitch, determining that the detection point is the second defect on the display panel.

4. The detection method of the display panel according to claim 3, wherein the standard separation cell pitch is n times of the standard pixel pitch, wherein n is an integer greater than or equal to 2.

5. The detection method of the display panel according to claim 1, wherein the detecting the first defect and the second defect of the display substrate comprises:
   detecting a first position coordinate set of normal separation cells and pixel defects on the display substrate and a second position coordinate set of the pixel defects and the defected separation cells.

6. The detection method of the display panel according to claim 5, wherein the determining the defected separation cell according to the first defect and the second defect comprises:
   obtaining a position coordinate set of the pixel defects by calculating an intersection set of the first position coordinate set and the second position coordinate set; and
   obtaining a position coordinate set of the defected separation cells by calculating a complementary set of the second position coordinate set according to the position coordinate set of the pixel defects.

7. The detection method of the display panel according to claim 1, wherein the separation cell is a position where a support post is planned to be arranged, the normal separation cell is a position where the support post is planned to be arranged and the support post is successfully arranged, and the defected separation cell is a position where the support post is planned to be arranged and the support post is not successfully arranged.

8. The detection method of the display panel according to claim 1, further comprising:
   obtaining a gray scale distribution diagram by scanning the display panel with an automatic optic inspection apparatus, and obtaining the gray scale value of the detection point and the gray scale values of the at least two comparison points from the gray scale distribution diagram.

9. A detection device of a display panel, comprising:
   a detection point selection module configured to select a detection point on a display substrate, wherein the detection point corresponds to a separation cell or a pixel cell;
   a comparison point selection module configured to select at least two comparison points for the detection point according to a set comparison pitch;
   a defect detection module configured to determine, according to a gray scale value of the detection point and gray scale values of the at least two comparison points, whether the detection point is a defect on the display panel so as to detect a first defect and a second defect of the display substrate, wherein the first defect comprises a normal separation cell and a pixel defect and the second defect comprises a pixel defect and a defected separation cell; and a defected separation cell determining module configured to determine the defected separation cell according to the first defect and the second defect.

10. The detection device of the display panel according to claim 9, wherein the defect detection module comprises:
a gray scale value sorting unit configured to sort gray scale values of the detection point and four comparison points by size;
a gray scale value comparison unit configured to select a third gray scale value in the sorting as a standard value and compare the gray scale value of the detection point with the standard value; and
a defect determining unit configured to determine that the detection point is the defect on the display panel if a difference between the gray scale value of the detection point and the standard value is greater than a set value.

11. The detection device of the display panel according to claim 10, wherein the defect determining unit is further configured to:
when the set comparison pitch is a standard pixel pitch, determine that the detection point is the first defect on the display panel; and
when the set comparison pitch is a standard separation cell pitch, determine that the detection point is the second defect on the display panel.

12. The detection device of the display panel according to claim 11, wherein the standard separation cell pitch is n times of the standard pixel pitch, wherein n is an integer greater than or equal to 2.

13. The detection device of the display panel according to claim 10, wherein the defect detection module also comprises: a gray scale acquisition module configured to obtain a gray scale distribution diagram by scanning the display panel and obtain the gray scale value of the detection point and the gray scale values of the at least two comparison points from the gray scale distribution diagram.

14. The detection device of the display panel according to claim 9, wherein the defect detection module comprises:
a coordinate set detection unit configured to detect a first position coordinate set of the normal separation cells and the pixel defects on the display substrate and a second position coordinate set of the pixel defects and the defected separation cells.

15. The detection device of the display panel according to claim 14, wherein the defected separation cell determining module comprises:
a pixel defect position coordinate set calculation unit configured to obtain a position coordinate set of the pixel defects by calculating an intersection set of the first position coordinate set and the second position coordinate set; and
a defected separation cell position coordinate set calculation unit configured to obtain a position coordinate set of the defected separation cells by calculating a complementary set of the second position coordinate set according to the position coordinate set of the pixel defects.

16. The detection device of the display panel according to claim 9, wherein the separation cell is a position where a support post is planned to be arranged, the normal separation cell is a position where the support post is planned to be arranged and the support post is successfully arranged, and the defected separation cell is a position where the support post is planned to be arranged but the support post is not successfully arranged.

17. A detection method of a display panel, the display panel comprising a plurality of separation cells and a plurality of pixel cells, and the detection method of the display panel comprising:
obtaining a gray scale distribution diagram by scanning the display panel with an automatic optic inspection apparatus, wherein the gray scale distribution diagram comprises a plurality of gray scale points, and the plurality of gray scale points are in one-to-one correspondence with the plurality of separation cells and the plurality of pixel cells;
taking each gray scale point as a detection point, determining a first set from the plurality of gray scale points according to a gray scale value of the detection point and gray scale values of a plurality of first comparison points, and determining a second set from the plurality of gray scale points according to the gray scale value of the detection point and gray scale values of a plurality of second comparison points;
determining gray scale points belonging to both the first set and the second set as a third set; and
determining a defected pixel cell according to the gray scale points in the third set, wherein whether the detection point belongs to the first set is determined by the following steps:
obtaining a first standard value according to the gray scale value of the detection point and the gray scale values of the plurality of first comparison points; and
if an absolute value of the difference between the gray scale value of the detection point and the first standard value is greater than a first threshold value, determining that the detection point belongs to the first set, and
wherein whether the detection point belongs to the second set is determined by the following steps:
obtaining a second standard value according to the gray scale value of the detection point and the gray scale values of the plurality of second comparison points; and
if an absolute value of the difference between the gray scale value of the detection point and the second standard value is greater than a second threshold value, determining that the detection point belongs to the second set.

18. The detection method of the display panel according to claim 17, wherein the plurality of first comparison points are determined according to a first comparison pitch, the plurality of second comparison points are determined according to a second comparison pitch, the first comparison pitch is one or more standard pixel pitches, the second comparison pitch is one or more standard separation cell pitches, and the standard separation cell pitch is n times of the standard pixel pitch, wherein n is an integer greater than or equal to 2.

19. The detection method of the display panel according to claim 10, wherein the number of the plurality of first comparison points is 4, and the number of the plurality of second comparison points is 4;
a method of acquiring the first standard value comprises:
sorting the gray scale value of the detection point and gray scale values of the four first comparison points by size, so as to obtain first sorting; and
taking a third-sized gray scale value in the first sorting as the first standard value; and
a method of acquiring the second standard value comprises:

sorting the gray scale value of the detection point and gray scale values of the four second comparison points by size, so as to obtain second sorting; and taking a third-sized gray scale value in the second sorting as the second standard value.

20. The detection method of the display panel according to claim 17, further comprising:

obtaining a fourth set by removing gray scale points belonging to both the second set and the third set from the second set; and determining a defected separation cell according to gray scale points in the fourth set, wherein a support post is planned to be arranged in the defected separation cell, but the support post is not successfully arranged.

* * * * *